Nov. 26, 1968   J. SLAPNIK   3,412,893
FOAM PLASTIC SHIPPING CONTAINER
Filed March 21, 1967   2 Sheets-Sheet 1

INVENTOR.
JOSEPH SLAPNIK
BY David M Bennell
his Attorney

Nov. 26, 1968  J. SLAPNIK  3,412,893
FOAM PLASTIC SHIPPING CONTAINER
Filed March 21, 1967  2 Sheets-Sheet 2

INVENTOR.
JOSEPH SLAPNIK
BY *David M. Bennell*
his Attorney

3,412,893
FOAM PLASTIC SHIPPING CONTAINER
Joseph Slapnik, Arcadia, Calif., assignor to Sinclair-Koppers Company, a partnership of Delaware
Filed Mar. 21, 1967, Ser. No. 624,936
4 Claims. (Cl. 220—97)

ABSTRACT OF THE DISCLOSURE

A shipping box for agricultural products is molded from foam plastic. The box has a gusset and post at each top corner which reinforces the container against breakage due to vertical and horizontal stresses during shipment. The box has a hole at each bottom corner adapted to receive the posts of a second tray when the trays are stacked. Optionally, a corrugated paper lid is provided for the box.

Background of the invention

The use of containers molded from materials such as foam polystyrene in the shipment of hard goods has been known for some time. The properties of the foam provide excellent insulation against shock and extremes of temperature. This use of foam plastic containers has been extended to the shipment of agricultural products such as fruits and vegetables. While the containers provide excellent protection for the products, particularly for fruits such as grapes, peaches, etc. which are easily bruised during handling and therefore decrease in value, against the mechanical shocks to which the products are subjected during loading and shipment, a problem that has been encountered is the fact that the rigid foam containers heretofore have been relatively brittle. When the containers are stacked as they must be during shipment the sides tend to bow out from the weight of the contents and the containers above which causes the sides to crack. Additionally, when the containers are placed in box cars or trucks the stopping and starting of the vehicles places horizontal pressures on the containers, which are stacked side by side, which causes the containers to crack at the corners. The damage due to vertical and horizontal pressures has been partially overcome by providing foamed lids for the containers and by separating the stacks of containers horizontally by bulkheads. However, these expedients are costly and in bulk shipment of produce where the cost of the containers become a substantial percentage of the ultimate selling price of the commodity, these expedients become commercially prohibitive.

Summary of the invention

In accordance with this invention, there is provided a box integrally molded from rigid foam plastic having a base, with apertures in each corner, and substantially vertically side walls extending therefrom, gussets extending between adjacent side walls at the top of each corner of the box and posts extending vertically from each gusset above the top edge of the box, both the gussets and the posts being integrally molded with the side walls. The apertures in each corner of the base are conformed to receive the posts of a second box when two boxes are stacked one on top of another. The boxes are optionally provided with a lid adapted to close the top of the box, the lid having apertures therein adapted to receive the posts such that the posts extend above the lid when the lid is in place. The lid has tabs extending into the apertures which tabs are adapted to enter slots in the posts of the box to hold the lid securely in place. The lid also can have one or more extensions which can be folded so as to be adjacent to an external surface of the side wall of the box and upon which can be printed or attached a label or other advertising device identifying the contents of the box and the producer.

Drawings

Detailed description

The above and further objects and novel features of the invention will appear more fully from the following detailed description when the same is read in connection with the accompanying drawings. It is to be expressly understood however that the drawings are not intended as a definition of the invention but are for the purpose of illustration only.

Figure 1:
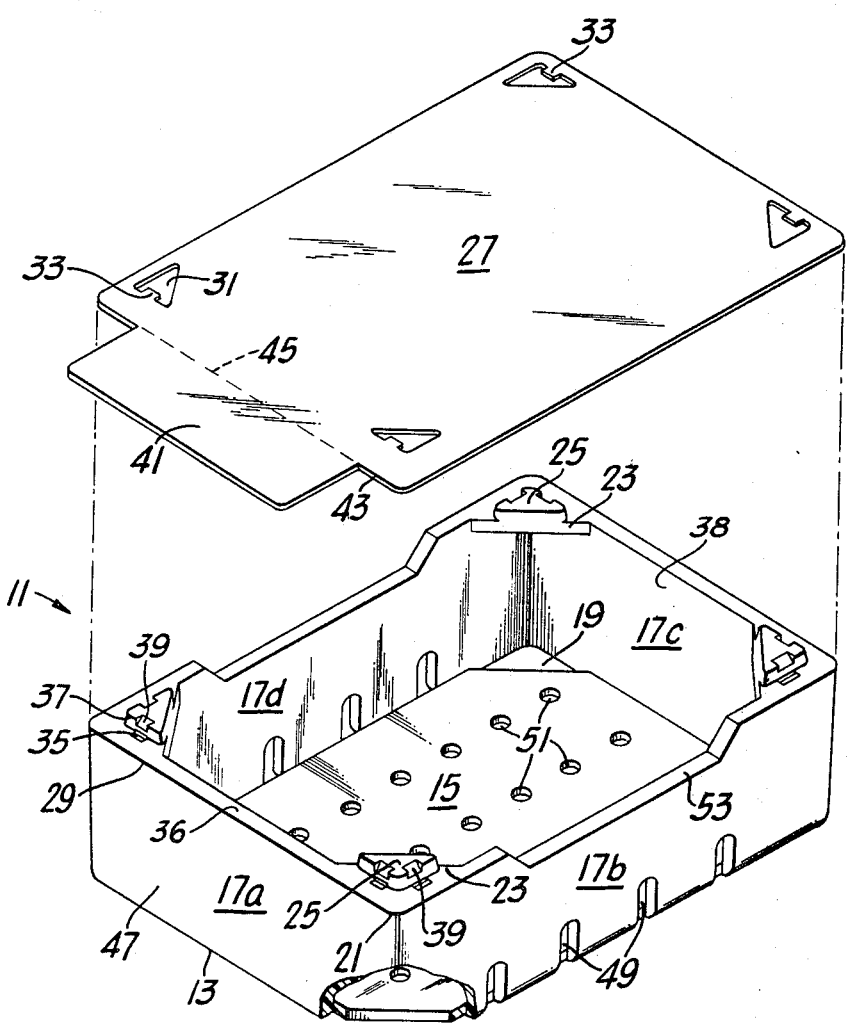
FIG. 1 is an expanded perspective view of a container constructed in accordance with the invention with portions broken away.
Figure 2:
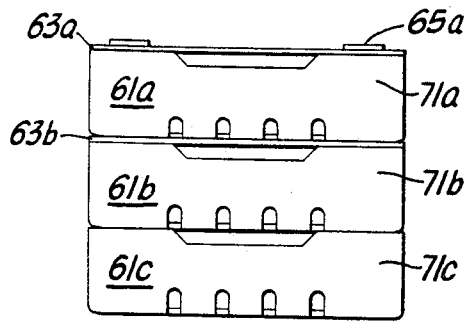
FIG. 2 is a perspective view of several containers in stacked interlocking relationship.
Figure 4:
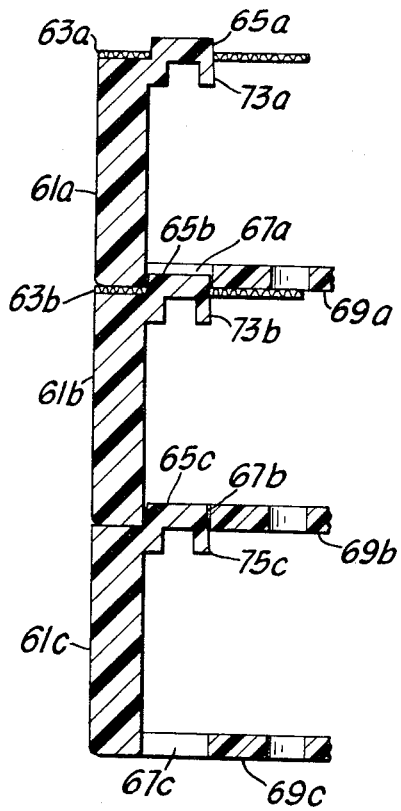
FIG. 4 is a vertical cross sectional view along lines IV—IV of FIG. 3.

Turning now to FIG. 1, a container 11 comprises a box 13 and lid 27. The box 13 has a base 15 and four substantially vertical side walls 17a, b, c and d extending therefrom. On each corner of base 15 there is an aperture 19 conforming in dimensions to post 25 whereby one box 13 can be stacked on another box with the posts 25 of adjacent boxes fitting into the apertures of the box immediately above as illustrated in FIGS. 2 and 4. At each top corner 21 of box 13 is a gusset 23 extending between adjacent side walls. Posts 25 extend from each gusset 23, the posts 25 having a vertical dimension approximately equal to the thickness of the base 15 of box 13 and horizontal dimensions slightly smaller, i.e., $\frac{1}{16}$–$\frac{1}{8}$ inch than the dimension of apertures 19. To close the box 13 when the container 11 is used individually and to further strengthen the container 11 and the contents against possible damage during shipment and handling, lid 27 is provided. Lid 27 is substantially coextensive with the top outside edge 29 of box 13 and has apertures 31 adapted to receive posts 25. Tabs 33 are adapted to fit into slots 35, which extend down from the top surface 36 of box 11 and through the interior surface 38 of box 11 at the base of posts 25, thereby holding the lid 27 securely in place. The portions of the outside edge 37 of posts 25 immediately above slots 35 are beveled to form surfaces 39 so that tabs 33 will slide over posts 25 without damage to the posts 25 or the tabs 33 when the lid 27 is placed in position on box 13. Lid 27 has a flap 41 extending beyond one edge 43 of lid 27 which is foldable along line 45 so that flap 41 is adjacent to the outer surface 47 of side 17a. The flap 41 is adapted to receive a label or other advertising device. Box 13 is provided with vertically extending apertures 49 in side walls 17a, b, c and d and circular apertures 51 in base 15 which provide both ventilation and drainage so that the contents will not deteriorate due to the presence of excess moisture. Additionally, the top edge 29 of side walls 17a and d is provided with cut-out portions 53 to furnish additional ventilation.

Lid 27 protects the contents of the box when another box is not stacked on top of box 13. Optionally lid 27 can be used between boxes when the boxes are stacked as further illustrated in FIGS. 2–4 below. The lid is conveniently made of corrugated paper, but any other suitable material such as plastic can be used.

It is to be understood that the material utilized in the construction of the box 13 of the invention may be integrally molded of any suitable rigid foam plastic material. Preferably, the container is molded from expandable polystyrene such for example as that sold under the trademark DYLITE. The molding of expandable polystyrene into foam structures is well known and is described for example in the article "Expandable Polystyrene" by Edwin A. Edberg in Modern Plastics, Encyclopedia Issue September 1957, pp. 347–350.

Turning now to FIG. 2, several containers 61a, 61b, 61c are shown in stacked interlocking relationship, the top two containers 61a and 61b being provided with corrugated paper lids 63a and 63b.

Figure 3:
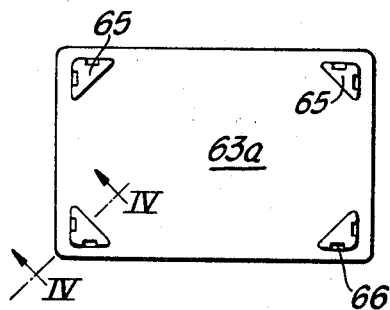
FIG. 3 is a top view of the stacked containers.

FIG. 3 is a top view of the stacked containers showing lid 63a in place and extending over posts 65a of the top box 61a. As shown in FIG. 4 when the boxes are stacked, posts 65b and 65c extend into apertures 67a and 67b in the bottoms 68a and 68b of each corner of the base of boxes 61a and 61b to lock the containers firmly in place. When containers 61a, 61b, 61c are so assembled the base 69a of container 61a acts to hold the corners of container 61b firmly in place which prevents the sides 71b (FIG. 2) of container 61b from cracking from the weight of other containers either above or alongside. Each box is additionally strengthened by the presence of gussets 73a, 73b, 73c at each corner.

Figure 5:
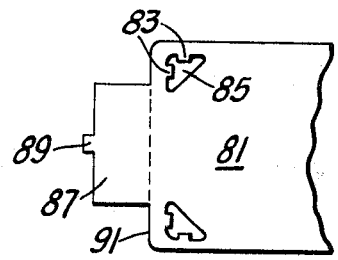
FIG. 5 is a top view of another embodiment of a lid constructed in accordance with the invention with parts broken away.
Figure 6:
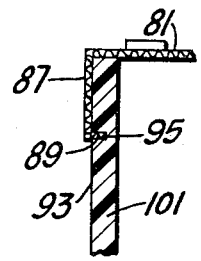
FIG. 6 is a vertical cross section with parts broken away showing the lid of FIG. 5 in place on another embodiment of the invention.

FIG. 5 is a partial view of another embodiment of a lid 81 suitable for use with boxes of the invention, the lid having locking tabs 83 and apertures 85 which are adapted to receive the vertical posts of the containers of the invention. Additionally, lid 81 has a flap 87 having a locking tab 89 extending from the outer edge 91 thereof. FIG. 6 shows the lid 81 in place on another embodiment of a box 101 of the invention with the flap portion 87 folded so that it is adjacent to the outer surface 93 of box 101 with tab 89 being folded to a substantially horizontal position and inserted in a slot 95 provided in the outer surface 93 of box 101 such that flap portion 87 of lid 81 which is adapted to receive a label or other advertising device is held securely in place adjacent to the outer surface 93 of box 101.

The foregoing has described novel boxes of foam plastic material useful for shipping agricultural products which are constructed so as to be resistant to breakage due to horizontal and vertical pressures thereon during shipment when the containers are placed in vertical and horizontally stacked relationship with one another. The boxes additionally can be provided with an inexpensive snap on lid which may have an extension flap for the placement of labels or other advertising devices. It therefore becomes unnecessary to place any labels on the foam box and the contents and manufacturer and producer of the product can be identified using the same unmarked containers merely by interchanging the relatively inexpensive paper lids. The boxes need not be custom made for each producer and can be used to ship different commodities which are easily identified by providing different lids.

I claim:

1. A shipping container comprising a box integrally molded from rigid foam plastic and a self-locking detachable lid, said box having a base, substantially vertical side walls extending from said base, gussets between adjacent side walls at the top of said box and posts extending vertically from each gusset above the top edge of said box, apertures in the base conforming in dimension to said posts whereby one box can be stacked on another box with the post of an adjacent box fitting through the aperture of the box immediately above, said lid being adapted to cover the top of said box, said lid having apertures therein adapted to receive said post, the relative vertical dimensions of said lid and said post being such that said post extends above said lid when said lid is in place on said box.

2. The container of claim 1 wherein said posts contain slots, said lid is of corrugated paper and has tabs extending into said apertures in said lid whereby said tabs enter said slots to hold said lid securely in place.

3. The container of claim 2 wherein said lid has a flap extending from an edge of said lid, said flap being foldable so as to be adjacent to the external surface of a side wall of said box.

4. The container of claim 3 wherein the external surface of said side wall of said box is provided with a slot and said flap has a foldable tab extending from its outer edge adapted to be received by said slot such that said flap is held securely in place adjacent to the external surface of said side wall.

References Cited
UNITED STATES PATENTS

| | | | |
|---|---|---|---|
| 2,995,269 | 8/1961 | Pease | 220—97 X |
| 3,057,510 | 10/1962 | Blacker | 220—97 |
| 3,172,562 | 3/1965 | Nascher et al. | 220—97 |
| 3,341,064 | 9/1967 | Ricci | 220—97 |

FOREIGN PATENTS 1,381,518  11/1964  France.

GEORGE E. LOWRANCE, *Primary Examiner.*